Jan. 8, 1963  G. W. GRABENHORST  3,072,130
VEHICLE POWER WASH APPARATUS
Filed Dec. 21, 1961  3 Sheets-Sheet 1

INVENTOR.
GEORGE GRABENHORST
BY
Donnelly, Mentag & Harrington
ATTORNEYS

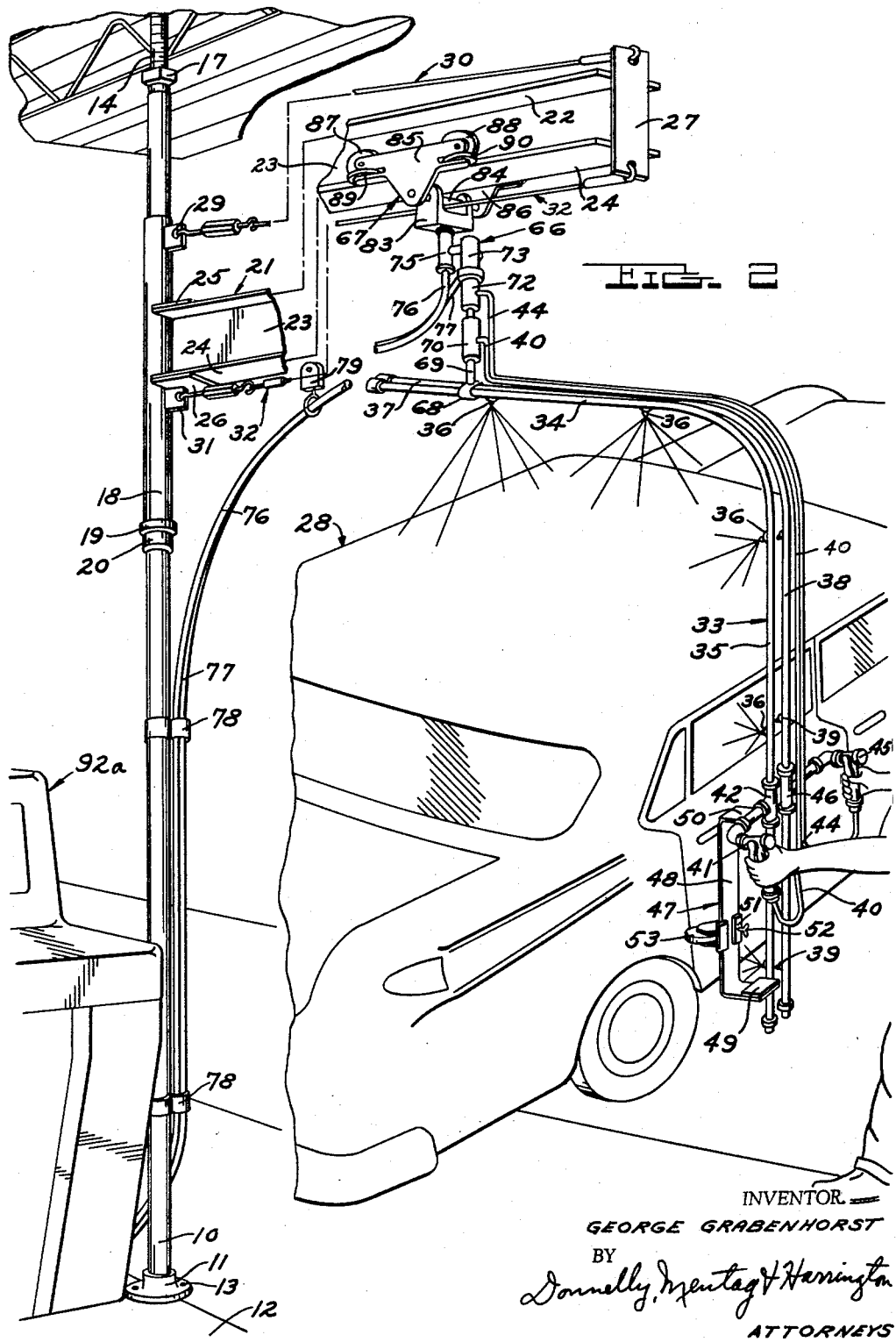

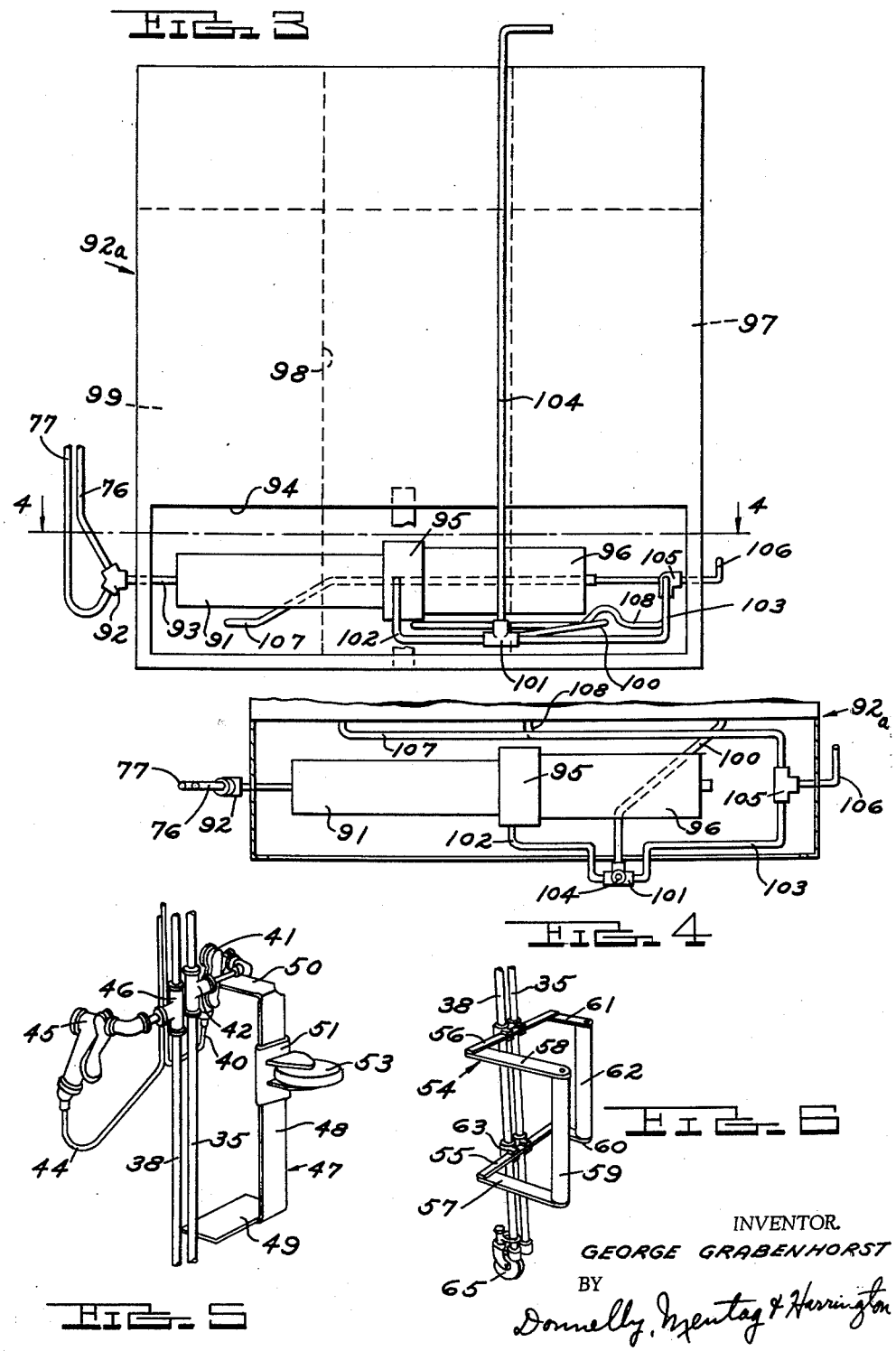

United States Patent Office 3,072,130
Patented Jan. 8, 1963

3,072,130
VEHICLE POWER WASH APPARATUS
George W. Grabenhorst, 8856 Hillcrest, Livonia, Mich.
Filed Dec. 21, 1961, Ser. No. 161,106
6 Claims. (Cl. 134—99)

This invention relates to improvements to apparatus for washing the bodies of automobiles and the like, and more particularly to a novel and improved vehicle power wash apparatus.

It is an important object of the present invention to provide an improved vehicle power wash apparatus which includes a spray unit adapted to alternately spray fluid detergent and rinse water under pressure over the top area and side area of a vehicle in a fast and efficient manner and which is suspended from an overhead movable carrier structure which permits the spray unit to be moved about the vehicle so that the detergent may be applied during a first movement around the vehicle and the rinse water may be applied in a second movement around a vehicle.

It is another object of the present invention to provide a novel and improved power wash apparatus for washing automobiles and the like and which is economical of manufacture, simple and compact in construction, easy to use and efficient in cleaning action.

It is a still further object of the present invention to provide a novel and improved power wash apparatus for washing automobiles and the like which is adapted to be operated by a single operator and which is provided with a built-in detergent and rinse water supply source and a guide means for guiding the spray unit of the device around a vehicle in a quick and efficient manner.

Other objects, features and advantages of this invention will be apparent from the following detailed description and appended claims, reference being had to the accompanying drawings forming a part of the specification wherein like reference numerals designate corresponding parts of the several views.

In the drawings:

FIG. 2 is a perspective, broken view of the structure illustrated in FIG. 1 and provided with a modified guide means;

FIG. 3 is a rear elevational view of a detergent and rinse water storage tank means employed with the structure illustrated in FIGS. 1 and 2;

FIG. 4 is a horizontal sectional view of the structure illustrated in FIG. 3, taken along the line 4—4 thereof and looking in the direction of the arrows;

FIG. 5 is a perspective elevational view of the guide means shown in the structure of FIG. 2; and, FIG. 6 is an elevational perspective view of the second type guide means shown in the structure of FIG. 1.

Figure 1:
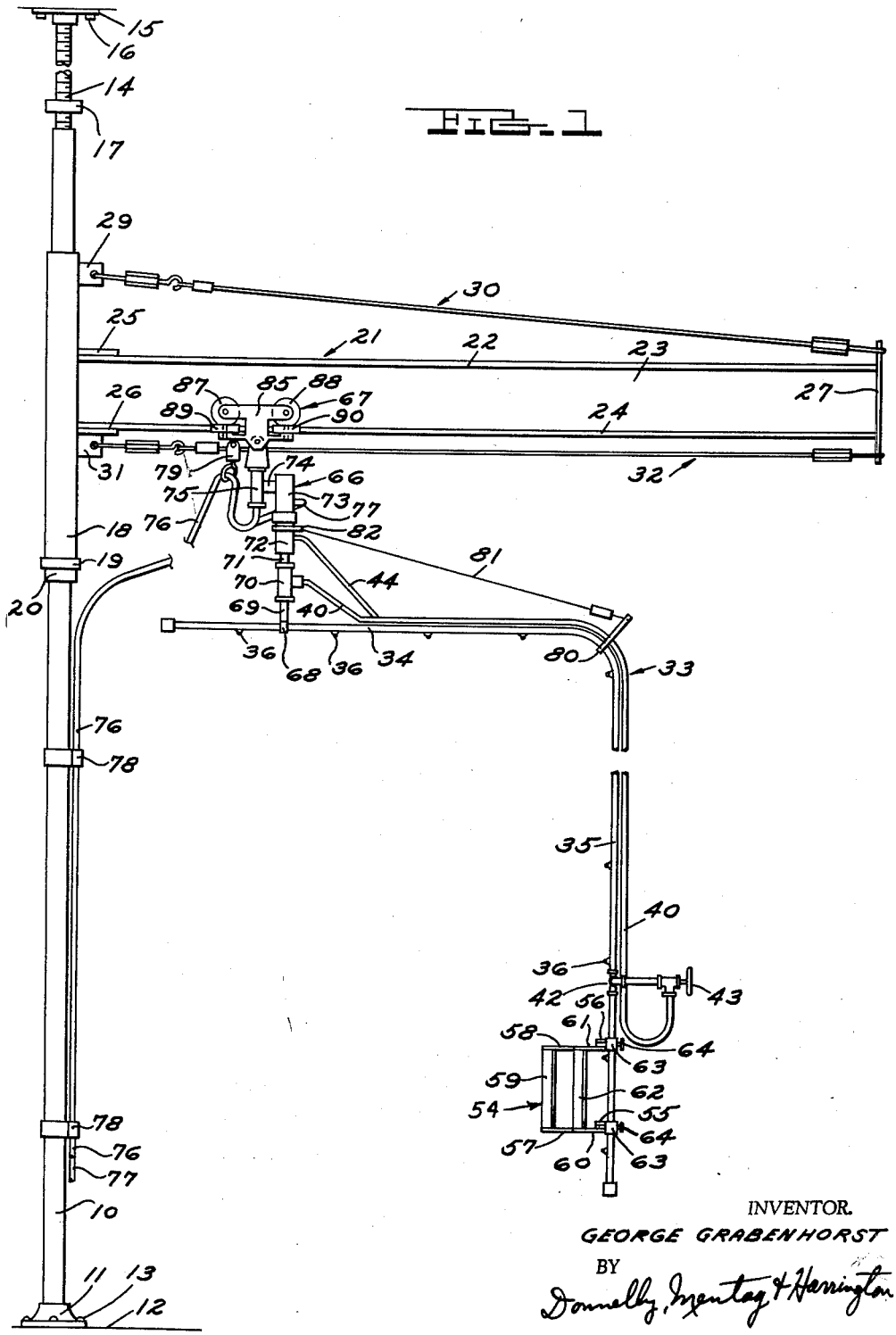
FIG. 1 is an end elevational view of a novel and improved vehicle power wash apparatus constructed in accordance with the principles of the present invention.

Referring now to the drawings, and in particular to FIGS. 1 and 2, the numeral 10 indicates a tubular post made from any suitable material as from pipe material and which has threadably mounted on the lower end thereof the retainer pad or footing 11. The pad 11 is adapted to rest on the floor of an auto wash building as indicated by the numeral 12, and be fixedly secured in place thereon by any suitable means as by means of the screws 13. The upper end of the tubular supporting post 10 is adapted to be secured to an overhead member as the roof of a building by means of the threaded rod 14 which has the lower end thereof threaded into the upper end of the post 12. Threadably mounted on the upper end of the threaded rod 14 is the retainer pad 15 which is provided with suitable holes as 16 for the reception of screws or the like to retain the pad 15 on the overhead ceiling or a beam or the like. The threaded rod 14 permits adjustment upwardly or downwardly to increase or decrease the overall length of the supporting rod 10 for obvious adjustment purposes relative to a roof, and the rod 14 is adapted to be secured in an adjusted position by means of the lock nut 17.

As illustrated in FIG. 2, the post 10 is mounted in a position adjacent the path or track over which an automobile follows through a car wash building, and in FIG. 2 the automobile is fragmentarily illustrated and designated by the numeral 28. The apparatus of the present invention includes the track generally designated by the numeral 21 which is made in the form of an I-beam and which is fixedly secured at one end thereof to the track support sleeve 18. The sleeve or tubular member 18 is rotatably mounted on the upper end of the post 10 at a position above the auto or vehicle to be washed and it rests on the bearing collar 19 which is held in place on the post 10 by means of the retainer ring 20 which is suitably secured to the post 10 by any suitable means as by welding or the like. The track I-beam 21 includes the upper horizontal flange 22, the integral vertical web 23 and the integral lower horizontal flange 24. As shown in FIGS. 1 and 2, the left end of the track 21, as viewed in these figures, is fixedly secured to the track support sleeve 18 by welding and the track is further braced and supported by the upper and lower horizontal brace plates 25 and 26 which are welded to the track sleeve 18 and against the top and bottom flanges of the track member 21. The brace plates 25 and 26 are also welded to the track 21. Welded to the right end or other end of the track is the vertical plate 27. Fixedly secured to the upper end of the track support sleeve 18 by any suitable means as by welding, is the upper cable anchor bracket 29 and a similar bracket 31 is secured to the track support sleeve 18 at a position below the track 21. An upper bracing cable 30 is mounted above the track 21 and has one end thereof connected to the upper end of the outer end plate 27 and the other end thereof connected to the anchor bracket 29 which is disposed above the track 21. A similar adjustable length chain 32 is interconnected between the lower end of the plate 27 and the lower anchor bracket 31.

As shown in FIGS. 1 and 2, a spray unit generally indicated by the numeral 33 is operatively suspended from the track 21 as described hereinafter in detail. The spray unit 33 includes a first fluid delivery pipe having an upper horizontal portion 34 which is adapted to be disposed over the top of a vehicle for delivering fluid downward on the vehicle, and a vertical portion or pipe indicated by the numeral 35 for delivering fluid along the side of a vehicle. The fluid delivery pipe portions 34 and 35 are shaped as an inverted L, and the ends thereof are capped or closed off by any suitable end cap means. The fluid delivery pipe portions 34 and 35 are provided with a plurality of spaced apart spray nozzles indicated by the numerals 36 for delivering fluid onto the top and one side of a vehicle. The spray unit 33 further includes the second fluid delivery pipe which is also inverted L-shaped and which has the top horizontal portion 37 and the integrally connected vertical side portion 38. The last mentioned fluid delivery pipe is also enclosed at the ends thereof and is provided with a plurality of spaced apart inwardly directed nozzles 39 which are the same as the spray nozzles 36. The first described delivery pipe having the portions 34 and 35 is supplied with a suitable fluid detergent by means of the flexible tubing or hose 40 which is connected at one end thereof to a suitable source of fluid detergent and which is connected at the other end thereof to the fluid delivery valve 41 which is illustrated in FIG.

2 as being of a pistol type valve, although it will be obvious that any suitable valve may be used. The valve 41 is connected at the outlet side thereof by suitable piping and the T connector pipe joint 42 to the vertical portion 35 of the first fluid delivery pipe. The second fluid delivery pipe comprising the portions 37 and 39 is supplied with a suitable rinse water by means of the flexible tubing or hose 44 which is also connected at one end thereof to a suitable source of rinse water and at the delivery end thereof to a pistol type valve 45 which may also be of any other suitable type valve construction. The valve 45 is connected at the outlet end thereof to the fluid delivery pipe portion 38 by suitable piping and the T connector pipe joint 46.

As shown in FIGS. 2 and 5, the power wash apparatus of the present invention may be provided with the first spray unit guide means generally indicated by the numeral 47 and which includes the vertical bar 48 which is spaced apart inwardly from the fluid delivery pipe portions 35 and 38. The vertical bar 48 is fixedly secured in position by means of the horizontal bottom and top bracket arms 49 and 50 which are welded to the fluid delivery pipe portion 35 and the piping between the valve 41 and the T connector pipe joint 42. The first spray unit guide means further includes the sleeve 51 which is slidably mounted on the bar 48 and adapted to be held in any adjusted position thereon by means of the lock bolt 52. The sleeve member 51 is provided with a pair of inwardly extended arms which are adapted to rollably support the roller 53 which is adapted to rollably engage the side of a vehicle as shown in FIG. 2. It will be seen that the roller guide means 47 maintains the fluid delivery pipe sections 35 and 38 at a desired predetermined distance from the vehicle while the operator moves the spray unit around the vehicle.

A second type spray unit guide means is illustrated in FIGS. 1 and 6 and is indicated generally by the numeral 54. This second type spray unit guide means comprises the lower horizontal bar 55 and the upper parallel, spaced apart horizontal bar 56. Fixedly mounted to one end of the bar 55 is the inwardly extended bar 57 which is disposed perpendicular to the bar 55. The bar 57 is preferably about twelve inches long. The bars 55 and 56 are also preferably about twelve inches long. A twelve inch length bar 58 is disposed above the bar 57 in spaced parallel relationship therewith and is connected at the outer end thereof to the one end of the bar 56. As clearly shown in FIG. 6, a vertically disposed roller 59 is operatively mounted between the inner ends of the bars 57 and 58. A pair of inwardly extended bars 60 and 61 are also fixedly connected to the opposite ends of the bars 55 and 56, and the bars 60 and 61 are approximately four inches in length. Operatively mounted between the inner ends of the bars 60 and 61 is a second vertical roller indicated by the numeral 62. The bars 55 and 56 are adjustably mounted on the pipe portions 35 and 38 in any suitable and desired position by means of a plurality of sleeve members 63 which are adapted to be secured in any desired adjusted position by means of the lock screws 64.

The spray unit guide means illustrated in FIGS. 1 and 6 serves the same purpose as the guide means of FIG. 5 in that it maintains the detergent and rinse delivery pipes at a desired predetermined distance from the side of the vehicle. It will be seen, that because of the shorter arms or bars 60 and 61, when the rollers 59 and 62 rollably engage the side of a vehicle, the spray nozzles 36 will be directed at the vehicle at an angle whereby the rinse water and detergent will flow away from the operator of the wash apparatus giving the fluid materials a push in the forward or rearward direction, depending on how the spray unit guide means is mounted, rather than in a direct perpendicular direction relative to the vehicle whereby the back splash toward the operator of the fluid materials is reduced and the movement of the detergent and rinse material may be maintained in one direction only. As shown in FIG. 6, the pipe portions 35 and 38 may be provided with a support roller 65 on the lower end thereof for supporting rolling engagement with the ground.

As shown in FIGS. 1 and 2, the spray unit 35 is carried by a rotating union structure 66 which is in turn suspended from a carriage generally indicated by the numeral 67. The fluid delivery pipe sections 34 and 37 are fixedly secured together by means of the pipe clamp 68 which is fixedly secured to the pipe 69 which has the upper end thereof threaded in the T-shaped pipe coupling 70. The detergent hose 40 is connected to the T-shaped pipe coupling 70. The upper end of the coupling 70 is connected by means of the pipe 71 to the lower outlet of the rotating union portion 72. The upper stationary portion of the rotating union member is indicated by the numeral 73 and is fixedly connected by means of the pipe 74 to the T-shaped pipe fitting 75. The upper end of the fitting 75 is fixedly secured to the U-shaped hanger member 83. Connected to the lower end of the fitting 75 is the detergent supply hose 76. The rinse water supply hose 44 is connected to a second outlet in the lower rotating portion 72 of the rotating union 66. A supply hose 77 for supplying rinse water is connected to the stationary portion 73 of the rotating union 66.

As shown in FIGS. 1 and 2, the supply hoses 76 and 77 are adapted to be secured to the post 10 by means of the clamps 78. There will, of course, be enough slack in the supply hoses 76 and 77 to permit the carriage 67 to be moved to the right of the position shown in FIG. 1 to positions as shown in FIG. 2. The slack hose may be carried by any suitable hanger means as by a plurality of slider means 79 which are suspended from the cable 32. The spray unit 33 may also be further supported by means of the bracket 80 which is connected by a suitable support cable 81 to the bracket 82 fixedly secured on the lower rotating portion 72 of the rotating union 66. A suitable rotating union 66 which is provided with a double passage or conduit therethrough for conducting both the detergent and rinse water is one available on the market and sold by the Dueblin Company of Chicago, Illinois, Model No. 1595. Any other union which permits rotating action and provides a double passage therethrough will also be suitable for this purpose.

As best seen in FIG. 2, the U-shaped hanger 83 is rockably supported by means of the shaft 84 between the vertical plates 85 and 86 of the carriage member 67. The plates 85 and 86 are disposed on opposite sides of the I-beam 21 and each of these plates is provided with the pair of spaced apart vertical rollers 87 and 88, which are adapted to roll on top of the surface of the I-beam lower flange 24, and, with the horizontally disposed rollers 89 and 90 which are adapted to roll on the outer edges of the I-beam lower flange 24. It will be seen that the aforedescribed rotating union and carriage structure permits the spray unit 33 to be moved inwardly and outwardly relative to a vehicle disposed under the spray unit 33, and such structure will also permit the spray unit 33 to be moved about a vehicle from side to side, and around each end thereof.

The detergent and rinse water supply lines or hoses 77 and 76 are adapted to be operatively connected to a suitable fluid supply pump, as the pump indicated by the numeral 91 in FIGS. 3 and 4 and which is adapted to be operatively mounted in the lower end of a cabinet indicated by the numeral 92a, as shown in FIGS. 2, 3 and 4. As shown in FIG. 3, the supply lines 76 and 77 are each connected at the inlet end thereof to the fitting 92 which is connected by the pipe 93 to the outlet end of the pump 91. FIG. 3 shows a rear side view of the cabinet 92a and the pump 91 is mounted in a recess 94 formed in the lower rear side thereof.

The pump 91 has an inlet 95 and is driven by an electric motor 96 supplied from a suitable source of electric power. Any suitable combination motor-pump means may be used. The pump 91 alternately draws rinse water from a rinse water tank 97 , and, fluid detergent from the main detergent tank 98 or the reserve detergent tank 99.

The tanks 97, 98 and 99 are built into the cabinet 92a in any suitable manner.

The rinse water tank 97 is connected by the pipe 100 to one inlet of the three-way flow control valve 101, which is connected by the pipe 102 to the inlet 95 of the pump 91. The pipe 103 is connected at one end thereof to the other inlet of the valve 101 and feeds detergent to this valve. The valve 101 is provided with the vertical control rod 104 for operating the valve to alternately permit the pump 91 to pump detergent or rinse water through the lines 76 and 77.

The detergent supply line 103 is connected to the outlet end of a second three-way flow control valve 105 which is operated by the control rod 106. The two inlet ends of the valve 105 are connected by the pipes 107 and 108 to the detergent tanks 99 and 98, respectively. The valve 105 permits selective use of detergent from the main detergent tank 98 or from the reserve detergent tank 99.

In the use of the vehicle power wash of the present invention, the operator sets the valve control rods 104 and 106 to feed detergent to the pump 91. After energizing the motor-pump unit, the operator positions the spray unit 33 over the vehicle and proceeds to operate the valve 41 to spray the vehicle with detergent. After one pass or movement around the vehicle, the rod 104 is changed to feed rinse water to the pump 91 and the valve 45 is operated to spray rinse water on the vehicle and the spray unit is moved around the vehicle. Experience has shown that a power wash apparatus of the present invention is efficient and fast in operation. The detergent and rinse water is supplied to the spray unit under high pressure and such pressure fluid is operative to clean the body of a vehicle without the need of brushes and the like.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What I claim is:
1. A vehicle power wash apparatus comprising:
 (a) a support post,
 (b) a track swingably mounted on said post and extended outwardly, horizontally therefrom,
 (c) a carriage movably mounted on said track,
 (d) and, a spray unit rotatably suspended from said carriage and adapted to successively spray detergent and rinse water under pressure on a vehicle for cleaning the vehicle.
2. A vehicle power wash apparatus comprising:
 (a) a support post,
 (b) a track swingably mounted on said post and extended outwardly, horizontally therefrom,
 (c) a carriage movably mounted on said track,
 (d) a spray unit including a detergent delivery pipe and a rinse water delivery pipe, and each of said delivery pipes being provided with a plurality of spaced apart spray nozzles disposed for successively spraying detergent and rinse water on the top and vertical outer surfaces of a vehicle,
 (e) means for rotatably suspending said spray unit from said carriage for movement of the spray unit about the vehicle,
 (f) guide means on said spray unit for maintaining the spray unit a predetermined distance from the vehicle as it is moved around the vehicle, and,
 (g) means for supplying detergent and rinse water to said detergent and rinse water delivery pipes.
3. A vehicle power wash apparatus comprising:
 (a) a support post,
 (b) a track swingably mounted on said post and extended outwardly, horizontally therefrom,
 (c) a carriage movably mounted on said track,
 (d) a spray unit including a detergent delivery pipe and a rinse water delivery pipe, and each of said delivery pipes being provided with a plurality of spaced apart spray nozzles disposed for successively spraying detergent and rinse water on the top and vertical outer surfaces of a vehicle,
 (e) means for rotatably suspending said spray unit from said carriage for movement of the spray unit about the vehicle,
 (f) guide means on said spray unit for maintaining the spray unit a predetermined distance from the vehicle as it is moved around the vehicle,
 (g) a cabinet disposed adjacent said post and provided with a rinse water tank and a detergent tank,
 (h) a pump,
 (i) valve and pipe means interconnecting said tanks and pump, and,
 (j) said pump being connected to said detergent and rinse water delivery pipes for alternately supplying detergent and rinse water to the same.
4. The structure as defined in claim 3, wherein: said guide means includes a horizontally disposed roller carried on said spray unit and engageable with the outer vertical surface of a vehicle.
5. The structure as defined in claim 3, wherein: said guide means includes a pair of vertically disposed laterally spaced apart rollers carried on said spray unit and engageable with the outer vertical surfaces of a vehicle, and wherein each of said rollers is spaced inwardly from the spray unit at a different distance.
6. The structure as defined in claim 3, wherein: said means for rotatably suspending said spray unit from the carriage includes a rotating union which is interconnected between said pump and said detergent and rinse water delivery pipes.

References Cited in the file of this patent
UNITED STATES PATENTS

| | | |
|---|---|---|
| 2,676,600 | Vani | Apr. 27, 1954 |
| 2,756,759 | Swain | July 31, 1956 |